United States Patent [19]

Planke

[11] Patent Number: 4,625,107

[45] Date of Patent: Nov. 25, 1986

[54] METHOD FOR CONTOUR RECOGNITION OF TOTALLY OR PARTLY TRANSPARENT OBJECTS, E.G., BOTTLES

[75] Inventor: Tore Planke, Nykirke, Norway

[73] Assignee: A/S Tomra Systems, Asker, Norway

[21] Appl. No.: 583,251

[22] Filed: Feb. 24, 1984

[30] Foreign Application Priority Data

Feb. 24, 1983 [NO] Norway .............................. 830648

[51] Int. Cl.$^4$ .............................................. G01B 11/24
[52] U.S. Cl. .................................. 250/223 B; 209/525; 356/376
[58] Field of Search ................ 209/524, 525; 250/227, 250/223 B, 224, 560; 356/376, 240, 391, 428; 358/101, 106, 107, 96

[56] References Cited

U.S. PATENT DOCUMENTS

| | | | |
|---|---|---|---|
| 3,840,303 | 10/1974 | Clarke .................................. | 250/560 |
| 4,055,834 | 10/1977 | Planke .......................... | 340/146.3 F |
| 4,064,534 | 12/1977 | Chen et al. ........................... | 250/560 |
| 4,183,013 | 1/1980 | Agrawala .................. | 340/146.3 AC |

FOREIGN PATENT DOCUMENTS

| | | | |
|---|---|---|---|
| 0006663 | 1/1980 | European Pat. Off. ................ | 11/24 |
| 2057123 | 3/1981 | United Kingdom ................... | 21/55 |

Primary Examiner—Edward P. Westin
Assistant Examiner—Stephone Allen
Attorney, Agent, or Firm—Kenyon & Kenyon

[57] ABSTRACT

A method for contour recognition of completely or partly transparent objects (2), e.g. containers like glass or plastic bottles, the object being advanced through an illumination and detector station (3–13; 3, 4, 20, 21) and there being illuminated on at least part of its circumference. The light reflected by the object (2) is viewed by a detector (4,3) against a background that is dark relative to the object, and the viewed image is recorded and converted to pulse signals that are processed to yield a numerical code characteristic of the object. During recording distinct signals are generated which are characteristic of the width ($b_n$) of the object relative its corresponding height ($h_n$) for a number of levels (n). The signals are then processed in a threshold circuit (24) and a pulse generating circuit (25) for the generation of the pulse signals (P), for each height ($h_n$) two pulses (22', 23') being formed, the distance between the leading edge of the first pulse (22') and the trailing edge of the second pulse (23') defining the width ($b_n$) of the object at said height ($h_n$). The distinctive signals are preferably generated by a TV camera, e.g. a CCD camera. Utilization especially in connection with contour recognition of return bottles.

25 Claims, 10 Drawing Figures

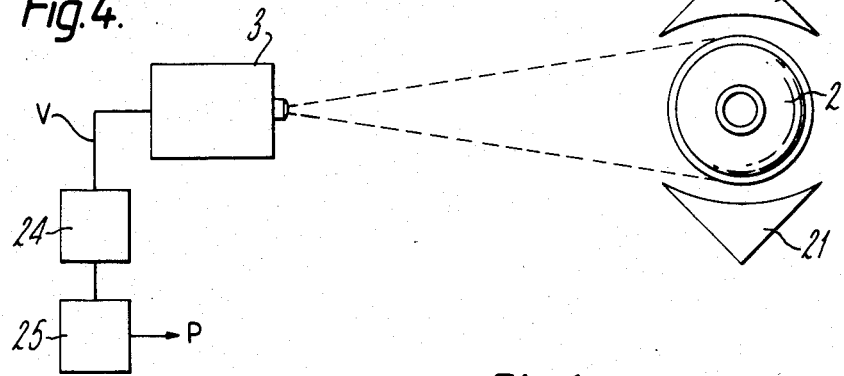
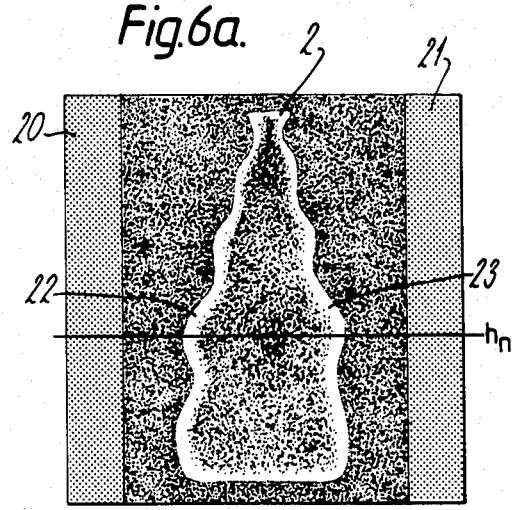
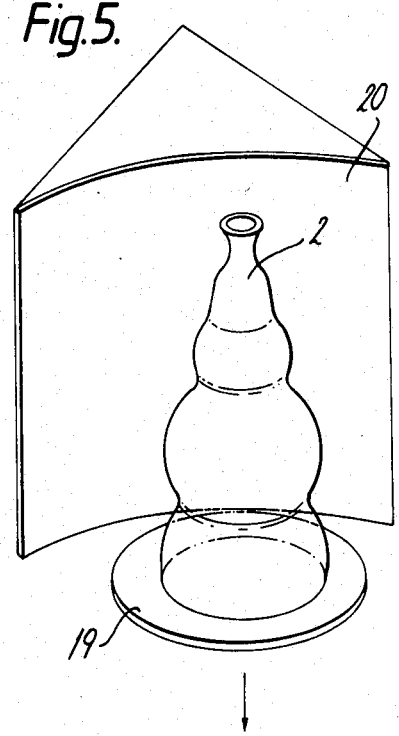
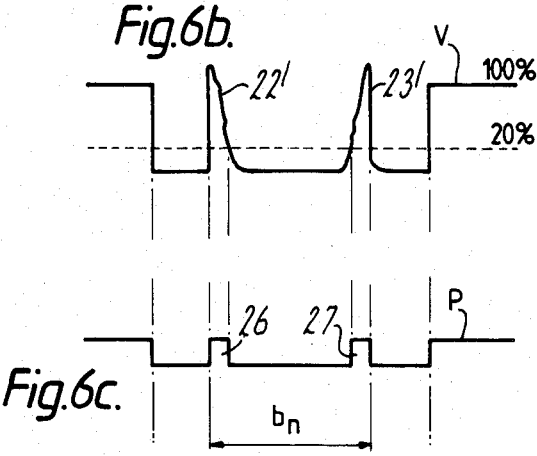

METHOD FOR CONTOUR RECOGNITION OF TOTALLY OR PARTLY TRANSPARENT OBJECTS, E.G., BOTTLES

BACKGROUND OF THE INVENTION

1. Field of the Invention

The present invention relates to a method for contour recognition of totally or partly transparent objects, e.g. bottles made of glass or plastic, and being advanced through an illumination and detector station and being illuminated there on at least one portion of the circumferencial area.

2. Description of Related Art

From U.S. Pat. Nos. 3,955,197 and 4,055,834 it is known to advance a bottle continuously through an illuminating and detector station, light being projected from one side of a conveyor toward the bottle to form a shadow image or part of a shadow image of the bottle on a light detector means. It is, thus, common to said devices that the light is projected toward the bottle, and if said bottle is made of glass or plastic refraction phenomena may occur to cause possible false signals in the detector. Even though such refraction phenomena are relatively small, in particular with the device described in U.S. Pat. No. 4,055,834 it is, nevertheless, desirable to obtain an image of the bottle or liquid container that is as true as possible.

Furthermore, it is known from U.S. Pat. No. 3,529,169 to keep a bottle immovable in the direction of conveyance while its contour is recognized in the illumination and detector station. U.S. Pat. No. 3,529,169 also describes means to rotate the object while it remains at said station. However, it has been desirable for some time to simplify both the illuminating and the detector portion of such a station.

SUMMARY OF THE INVENTION

The present invention, thus, has the object to provide a method for recognizing an accurate contour of the object and for "freezing" the image during a sufficient interval to enable recognition of the contour of said object.

The features characterizing said method will appear from the following claims as well as from the following description with reference to the attached drawings.

BRIEF DESCRIPTION OF THE DRAWINGS

FIGS. 4 and 5 show a modification of the embodiments as shown in FIGS. 1 and 3.

FIGS. 6a, b, c illustrates the detection of the contour of the object.

DETAIL DESCRIPTION OF THE INVENTION

In the following description the object is embodied by a bottle, e.g. an empty bottle. The bottle may be totally or partly transparent, bright or dark, made from glass or plastic. However, it will be obvious that any conveyable object of the kind mentioned above may be used, not necessarily a liquid container such as a bottle.

Figure 1:
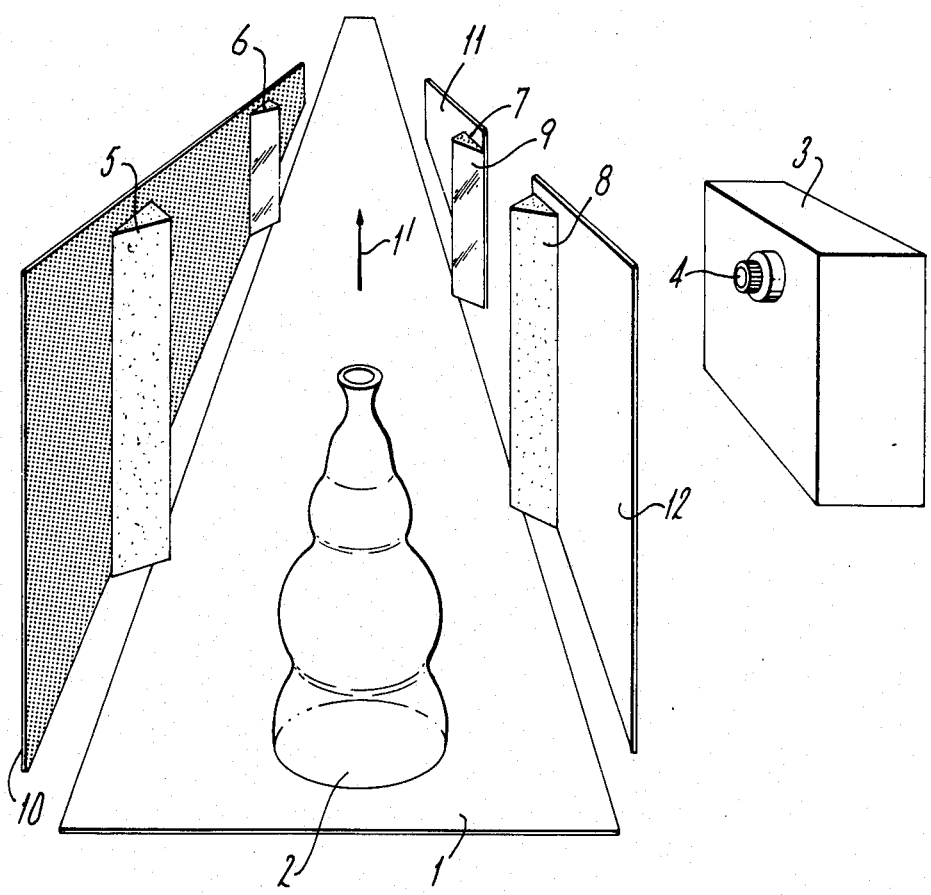
FIG. 1 shows an illustrative embodiment of the invention.
Figure 2:
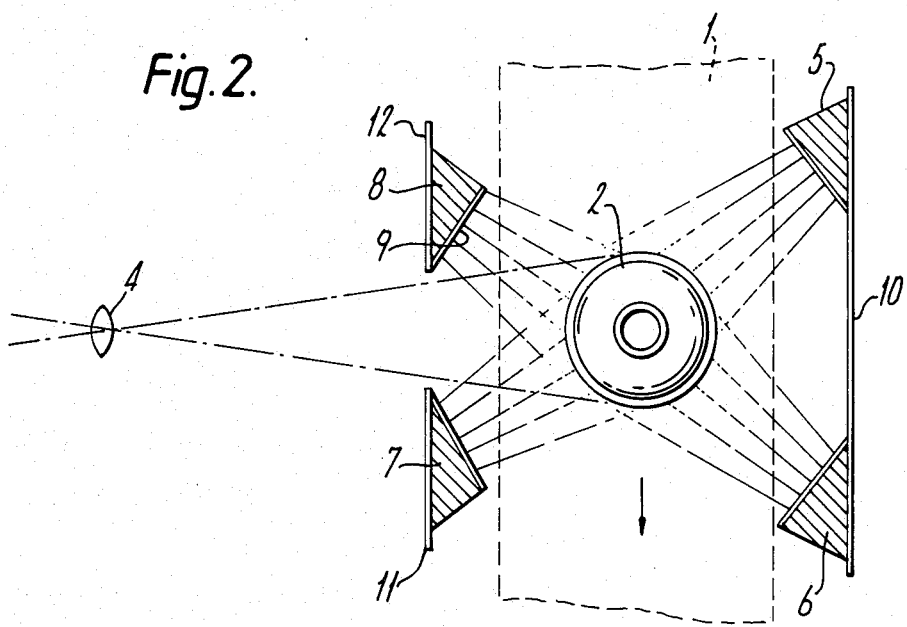
FIG. 2 shows a plan view of the embodiment according to FIG. 1.

As shown in FIGS. 1 and 2 the bottle 2 is placed on a conveyor 1 moving in the direction of arrow 1'. A detector 3, 4 is provided laterally of said conveyor and is arranged to detect mainly tranversely of said conveyor. Detector 3 comprises a lens means 4 preferably causing the image of the bottle to be depicted with good depth of focus.

On the opposite side of conveyor 1 a contrast forming wall or background 10 may be provided and should be as dark as possible. On the opposite side of conveyor 1 corresponding light sources 7, 8 are provided. The mutual distance between light sources 5, 6 is greater than between light sources 7, 8 in the shown embodiment. Preferably, the light sources emit a diffused light from a surface 9 of said light sources. The light from the light sources may be continuous or intermittent or synchronized in such a manner that the light sources emit a flash when the bottle 2 is directly opposite lens means 4. Said last solution may be particularly advantageous if the detector 3 is a CCD (Charge Coupled Device) camera. Light sources 7, 8 may be secured to screen walls indicated by 11 and 12 respectively. Said screen walls prevent the light from light sources 5 and 6, respectively, to enter further into the space between the screen walls 11, 12 and the detector. Screen walls 11, 12 are arranged at a certain distance from each other in the direction of conveyance of said conveyor, thus forming a viewing window for the detector.

Figure 3:
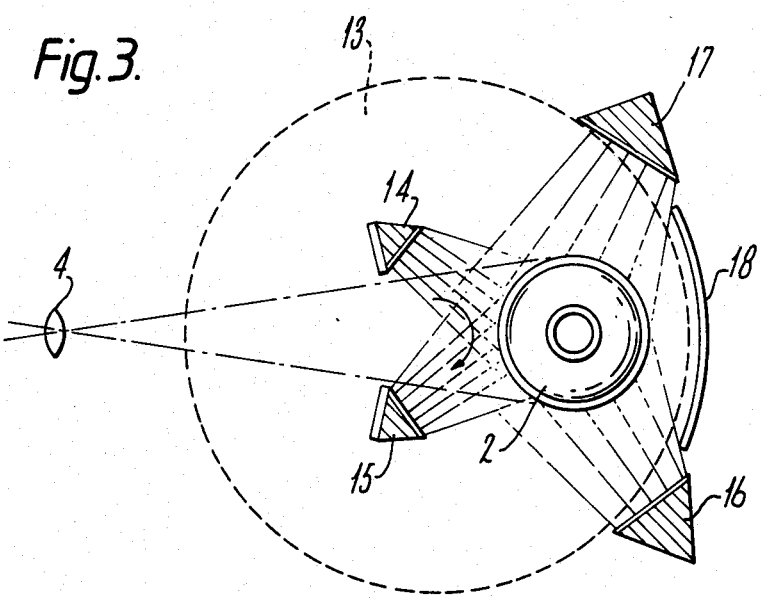
FIG. 3 is a modification of the embodiment according to FIG. 2.

FIG. 3 is a modification of the embodiment shown in FIG. 2, the light sources 14, 15, 16, 17 corresponding to light sources 8, 7, 6, 5 in FIG. 2, and the contrasting screen or background 18 corresponding to background 10 in FIG. 2. In the embodiment shown in FIG. 3 the wall 18 is preferably curved. However, it will be understood that background 18 does not necessarily consist of a solid wall but may be a dark space in the cabinet housing the device. Conveyor 13 is a rotating disk in the present embodiment.

FIG. 4 shows an embodiment where the bottle 2 is moved downward from above or upward from below, as indicated in FIG. 5. The bottle may be moved in this manner by a conveyor in the form of a movable support 19, e.g. a plate or other suitable support. The bottle is illuminated e.g. by two sources of light 20, 21. In a preferred embodiment the detector 3 may be a TV camera known per se, e.g. a memorizing camera of the CCD type.

The discussion below will concern the embodiment according to FIG. 4 as well as that of FIGS. 1-3, but to simplify the description FIG. 6 is described in connection with the embodiment according to FIG. 4.

As mentioned above, the present invention relates to contour recognition of completely or partly transparent objects, e.g. like bottles. The invention is based on the principle that when such an object is illuminated it will reflect light from its surface. When viewing such an illuminated bottle or the like through a TV camera or a CCD camera the bottle 2, as seen from the camera along its largest diameter, will exhibit a bright, narrow and outwardly sharply limited area 22, 23.

For a height h chosen by way of example of the bottle 2 the detector 3 will generate a video signal V, as indicated in FIG. 6b. Said video signal has two signal peaks 22', 23'. To obtain an unambiguous image of the width b of the bottle at this level h, the video signal V is sent to a threshold circuit 24 and a pulse generating circuit 25. Thus, a pulse signal P is formed with a first 26 and a second 27 pulse, said width b being defined by the distance between the leading edge of pulse 26 and the trailing edge of pulse 27. Said threshold as indicated in FIG. 6b may be placed at any suitable level. In the embodiment under discussion said threshold is placed on 20% of the maximum video amplitude emerging from the detector. If a TV camera is used as a detector, every line of the total TV image will, thus, contain information on the width b of the bottle at a corresponding height h of the bottle. The line pulses obtained in this manner may, if desired, be converted into a digital code to present a clear definition of the bottle.

Figure 7:
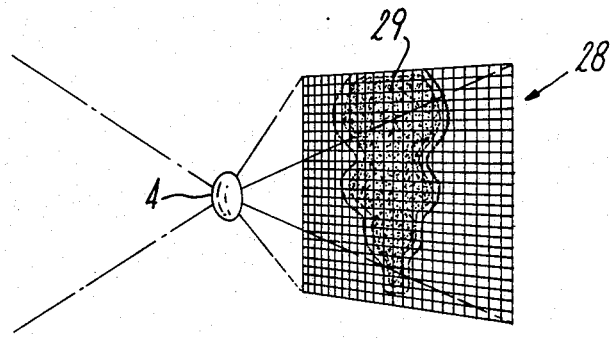
FIGS. 7 and 8 are schematic illustrations of various embodiments of detectors that may be used in the device according to the invention.
Figure 8:
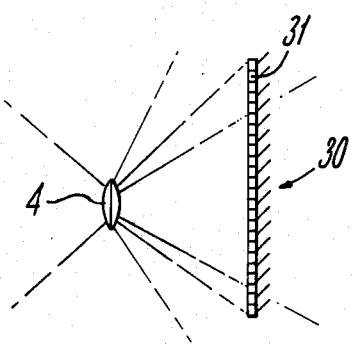

In FIGS. 7 and 8 alternative embodiments of the detector unit 3 are shown. In FIG. 7, thus, a photo sensitive image storage unit 28 is shown that may comprise a number of elements 29. Said unit 28 is able to store an image that is transferred to said elements. Said elements may e.g. be so called "charged coupled devices" (CCD), and the used detector 3 may, thus, be called a CCD camera. Such CCD cameras are known per se and are among others to be found in modern facsimile transfer equipment and in miniature TV cameras. As indicted above, the use of a CCD camera is particularly advantageous in connection with flashlight illumination, such a camera in contrast to a conventional TV camera having a considerably better storage effect of the image.

In the embodiment indicated in FIG. 8 a column, e.g. of CCD elements or equivalents thereof are used. When the image of the bottle is transferred via said lens unit 4 to the detector 30, a line point defined image of the bottle will be obtainable as said bottle moves past said detector. In this case, at the same time as the bottle passes an intermittent read-out of status of the separate elements 31 of the detector must be made and "zero-setting" of said elements must, thus, occur rapidly, the read-out information being stored in a memory.

The solutions shown in FIGS. 7 and 8 will be particularly suited in the embodiment shown in FIGS. 1-3, i.e. where the bottle is preferably moved continuously past said detector station. In connection with the embodiment shown in FIG. 4 is may be advantageous to keep the bottle at rest for a short moment, which is sufficient for forming a complete TV image of the bottle, whereupon said bottle continues its movement. When a CCD camera or the like is used it may, however, be possible to move the bottle continuously through the detector station, the light sources emitting a light flash when the bottle is directly in front of the lens 4 of the detector 3.

What is claimed is:

1. In a method for contour recognition of at least partly transparent objects, comprising advancing the object through an illumination and detector section and illuminating the object over at least part of its circumferential area, the improvement comprising viewing the light reflected by the surface of said object against a dark background with the detector; viewing the light areas occurring at the exterior contour of said object; recording and converting said areas into pulse signals; and processing said pulse signals to yield a numerical code defining said object.

2. A method as stated in claim 1, wherein said objects comprise bottles made of glass or plastic.

3. A method as stated in claim 1, comprising generating distinct signals characteristic of the width and relative height of a number of levels of the object during recording, and then threshold processing and converting said signals into said pulse signals, two pulses being formed for each height, the distance between the leading edge of the first pulse and the trailing edge of the second pulse defining the width of the object at said height.

4. A method as stated in claim 3, comprising using the output signals from a TV camera as said distinct signals.

5. A method as stated in claim 4, wherein said camera is a CCD camera.

6. A method as stated in claim 4, wherein said illuminating of the objects is carried out continuously.

7. A method as stated in claim 4, wherein said illuminating is carried out intermittently with the momentary position of said object directly opposite to the detector.

8. A method as stated in claim 4, wherein said illuminating is carried out synchronously with the momentary position of said object directly opposite to the detector.

9. A method as stated in claim 3, wherein said illuminating of the objects is carried out continuously.

10. A method as stated in claim 3, wherein said illuminating is carried out intermittent with the momentary position of said object directly opposite to the detector.

11. A method as stated in claim 3, wherein said illuminating is carried out synchronously with the momentary position of said object directly opposite the detector.

12. A method as stated in claim 1, wherein said illuminating of the objects is carried out continuously.

13. A method as stated in claim 1, wherein said illuminating is carried out intermittent with the momentary position of said object directly opposite to the detector.

14. A method as stated in claim 1, wherein said illuminating is carried out synchronously with the momentary position of said object directly opposite the detector.

15. A method as stated in claim 8, comprising moving said object continuously past a viewing window in said detector.

16. A method as stated in claim 7, comprising moving said object continuously past a viewing window in said detector.

17. A method as stated in claim 6, comprising moving said object continuously past a viewing window in said detector.

18. A method as stated in claim 4, comprising moving said object continuously past a viewing window in said detector.

19. A method as stated in claim 3, comprising moving said object continuously past a viewing window in said detector.

20. A method as stated in claim 1, comprising moving said object continuously past a viewing window in said detector.

21. A method as stated in claim 8, comprising moving said object to a position within a viewing window of the detector and keeping it immobile there at least during the viewing time of the detector, and then removing the object.

22. A method as stated in claim 7, comprising moving said object to a position within a viewing window of the detector and keeping it immobile there at least during the viewing time of the detector, and then removing the object.

23. A method as stated in claim 6, comprising moving said object to a position within a viewing window of the detector and keeping it immobile there at least during the viewing time of the detector, and then removing the object.

24. A method as stated in claim 3, comprising moving said object to a position within a viewing window of the detector and keeping it immobile there at least during the viewing time of the detector, and then removing the object.

25. A method as stated in claim 1, comprising moving said object to a position within a viewing window of the detector and keeping it immobile there at least during the viewing time of the detector, and then removing the object.

* * * * *

UNITED STATES PATENT AND TRADEMARK OFFICE
CERTIFICATE OF CORRECTION

PATENT NO. : 4,625,107
DATED : November 25, 1986
INVENTOR(S) : Tore PLANKE

It is certified that error appears in the above-identified patent and that said Letters Patent is hereby corrected as shown below:

| Column | Line | |
|---|---|---|
| 2 | 63 | Change "h" to --$h_n$--. |
| 2 | 67 | Change "b" to --$b_n$--. |
| 2 | 67 | Change "h" to --$h_n$--. |
| 3 | 2 | Change "b" to --$b_n$--. |
| 3 | 10 | Change "b" to --$b_n$--. |
| 3 | 11 | Change "h" to --$h_n$--. |
| 3 | 24 | Change "indicted" to --indicated--. |

In the Abstract  Line 12, After "relative" insert --to--.

Signed and Sealed this

Eleventh Day of August, 1987

Attest:

DONALD J. QUIGG

Attesting Officer

Commissioner of Patents and Trademarks